United States Patent [19]

Kakazu et al.

[11] Patent Number: 4,837,703

[45] Date of Patent: Jun. 6, 1989

[54] METHOD FOR GENERATING TOOL PATH

[75] Inventors: Yukinori Kakazu, Ebetsu; Noburo Minami; Katsuhiko Nukui, both of Numazu, all of Japan

[73] Assignee: Toshiba Kikai Kabushiki Kaisha, Tokyo, Japan

[21] Appl. No.: 63,644

[22] Filed: Jun. 17, 1987

[30] Foreign Application Priority Data

Jun. 26, 1986 [JP] Japan ................................. 61-150529

[51] Int. Cl.[4] ............................................. G06F 15/00
[52] U.S. Cl. .......................... 364/474.18; 364/474.28; 364/191; 364/474.25
[58] Field of Search ................................ 364/167–171, 364/474–476, 191

[56] References Cited

U.S. PATENT DOCUMENTS

| | | | |
|---|---|---|---|
| 4,617,823 | 10/1986 | Inoue et al. | 364/474 X |
| 4,618,924 | 10/1986 | Hinds | 364/474 X |
| 4,641,270 | 2/1987 | Lalloz et al. | 364/476 |

*Primary Examiner*—Allen MacDonald
*Attorney, Agent, or Firm*—Koda and Androlia

[57] ABSTRACT

The issue of tool path generation has so far been approached from points of automatic programming system on typified by APT. In the automatic programming system, however, patterns of workpieces should be recognized by operators, and if the workpieces are of complicated shapes, it should require much skill and time. Studies have been conducted in recent years to generate tool paths by building up in advance solid models in a computer, and modifying the models for a particular problem everytime it needs to be solved. According to this invention method, a required shape and an environmental model including a workpiece are modeled in three-dimensions by using CSG models, and are offset in a normal direction of the surface in correspondence to the tool radius to convert the tool into a line tool so that the problem is replaced with a graphic problem viewed from the tool axis direction. In other words, this invention method attempts to solve the problem of checking tool collision by a hidden line or surface removal process of a graphic algorithm, and further the shape is offset by an offset value decided by taking into consideration an appropriate finish margin to thereby enhance efficiency in machining.

7 Claims, 13 Drawing Sheets

METHOD FOR GENERATING TOOL PATH

BACKGROUND OF THE INVENTION

1. Field of the Invention

This invention relates to a method for generating tool paths in CAD (Computer Aided Design)/CAM (Computer Aided Manufacturing) systems, and more particularly to a method for generating tool paths which can easily check the collision with a tool and can enhance efficiency in manufacture by offset-processing environmental model including a workpiece which is expressed in solid models.

2. Description of the Prior Art

The issue of tool path generation has so far been approached from points of automatic programming system and so on typified by APT (Automatically Programmed Tools. In the automatic programming system, however, patterns of workpieces should be recognized by operators, and if the workpieces are of complicated shapes, it should require much skill and time.

What is most principal in the issue of tool path generation are the problems related to the collision between the environmental model and the tools such as:

1. The problem to recognize the area where cutting is impossible in a designated tool approach direction;
2. The problem of the collision between the environmental model including the workpiece and the portion the tool does not cut; and
3. The problem of how to recognize an intersurface relation between an area to be cut which may comprise plural surfaces and the cutting edge of the tool.

Figure 1:
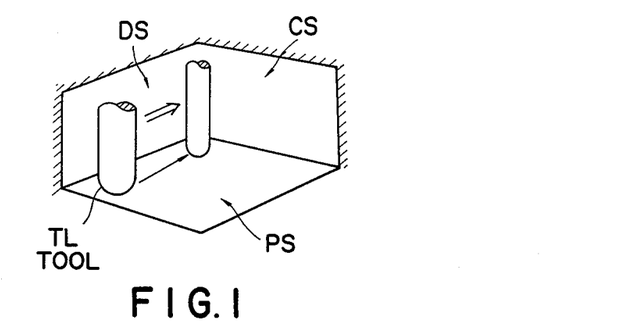
FIG. 1 is a conceptual view of a drive surface, part surface, and a check surface in the APT system.
Figure 2:
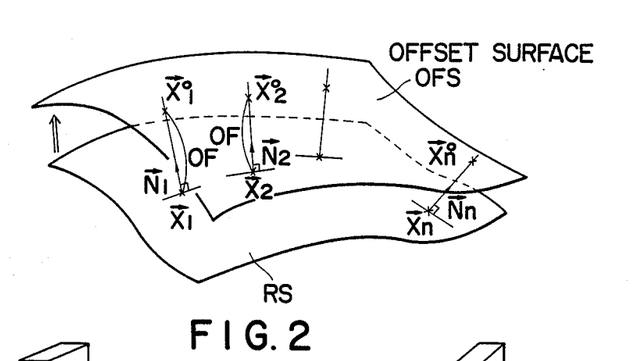
FIG. 2 shows a conventional method of offset operation.

In order to solve the above problem, in the APT system, as shown in FIG. 1, an operator should set three surfaces where a tool TL can move: i.e. a part surface PS, a drive surface DS and a check surface CS. The intersurface relation or the collision check between an envionmental model (3D-solid model) and a tool (3D-solid model) cannot be solved analytically, and even if solved by the search, it would consume much time and energy. In offset-processing, the conventional method needs a large amount of data as new points should be obtained by the following equation (1) for each point on the surface and an offset surface should be formed by interpolating those new points. FIG. 2 shows the relation between the original surfaces RS and an offset surface OFS wherein the points $\vec{X}_1, \vec{X}_2, \ldots, \vec{X}_n$ are respectively offset value OF to become the points $X_1°, X_2°, \ldots, X_n°$ on the offset surface OFS. The relation can be expressed mathmatically by the equation (1) below:

$$\vec{X}° = \vec{X} \pm OF \cdot \vec{N}(\vec{X}) \quad (1)$$

wherein OF denotes the offset value, and $\vec{N}(\vec{X})$ denotes a unit normal vector at a point $\vec{X}$. The offset surface OFS thus obtained is an approximated surface, and therefore the collision check with tools cannot be solved analytically therein.

Figure 3:
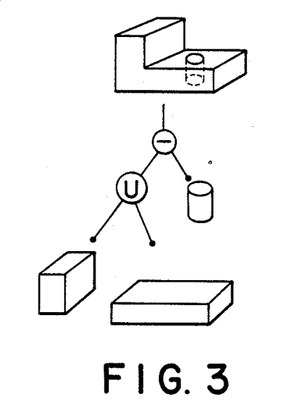
FIG. 3 is a view to show an expression by CSG.
Figure 4:
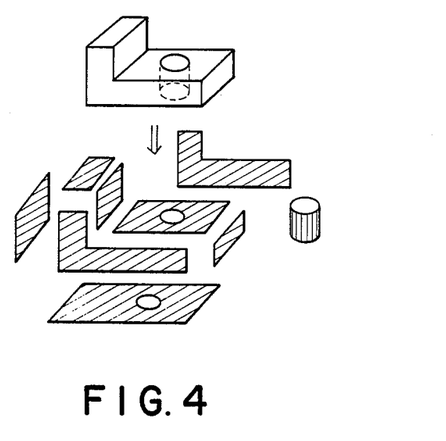
FIG. 4 is a view to show an expression by B-Reps.

Studies have been conducted in recent years to generate tool paths by building up in advance 3D-solid models in a computer, and modifying the models for a particular problem everytime it needs to be solved. Two types of the solid models exist; i.e. CSG (Constructive Solid Geometry) and B-Reps (Boundary Representation). As shown in FIG. 3, CSG is advantageous in that the data structure is simple and processing at high speed is possible, since a shape can be expressed by a set operation of primitives such as a cylinder, a rectangular parallelepiped, etc. On the other hand, B-Reps is not expected to operate at higher speed as the amount of data is large and the structure complicated as shown in FIG. 4. It creates a closed two-dimensional manifold in a three-dimensional space for modeling by supplying the basic topological data of a model and the geometric data on elements of the topological relation such as a vertex, an edge and a curved surface.

SUMMARY OF THE INVENTION

The invention was contrived to eliminate aforementioned difficulties encountered in the prior art, and aims at providing a method for generating tools paths wherein the relation between an environmental model including a workpiece and a tool (including a tool holder) is replaced with the relation between a 3D-solid model and a line which can be easily checked of collision by offsetting an evironmental model in normal direction of surface in correspondence to the tool radius, to regard the problem as a graphics viewed from the tool axis and to apply a graphic algorithm.

This invention relates to a tool path generation method which replaces the relation between an environmental model including a workpiece and tools expressed in 3D-solid models with the relation between the environmental model offset in the normal direction of the surface and in correspondence to the tool radius and a line tool converted from the tool.

Further, according to this invention method, a desired shape and an environmental model including a workpiece are modeled in three-dimensions by using CSG models, and are offset in a normal direction of surface in correspondence to the tool radius to convert the tool into a line tool so that the problem for generating tool paths is replaced with a graphic problem viewed from the tool axis direction. In other words, this invention method attempts to solve the problem of collision check with a tool by a hidden line (surface) removal process of a graphic algorithm, and further the models are offset by offset value decided by taking into consideration an appropriate finish margin to thereby enhance efficiency in machining. This invention method can roughly be classified into two processes: one is a process to execute offset processing of the CSG data to form the offset CSG data, and the other is a process to generate tool paths from the data with a graphic algorithm.

The nature, principle and utility of the invention will become more apparent from the following detailed description when read in conjunction with the acompanying drawings.

DESCRIPTION OF THE PREFERRED EMBODIMENTS

Figure 5:
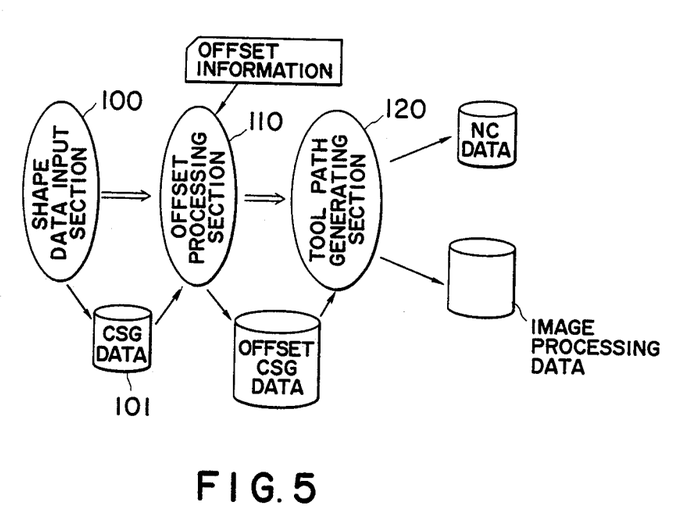
FIG. 5 is a schematic view of this invention method.

FIG. 5 shows schematically the process of this invention method for generating tool paths. The processing section mainly comprises a shape data input section 100, an offset processing section 110, and a tool path generating section 120 by a graphic algorithm. Since this invention process outputs not only the tool paths (NC data) by the graphic algorithm but also intensity information, the tool paths are operatively displayed on a screen.

Since the CSG models are used as the solid models in this method, the shape data input section 100 inputs data for every closed primitives (basic shapes) which are elements of the shapes and stores the CSG data 101 in a computer. The CSG data 101 can be expressed mathematically as follows. Relation holds as below by a set operation (union, difference, product operation) of primitives $P_i$ if a 3D-solid model is expressed as $S_n$.

$$S_n = ((\ldots((\phi.OP_1.P_1).OP_2.P_2)\ldots ).OP_n.P_n) = (S_{n-1}.OP_n.P_n) \quad (2)$$

In the above equation (2), $OP_i$ denotes a set operation and the parentheses denote the order of set operations. The equation (2) expresses that the 3D-solid model $S_n$ can be formed by the set operation of the primitive in the number of n sequentially or, in other words, it can be formed by the set operation ($.OP_n.$) of the n-th primitive $P_n$ to the shape $S_{n-1}$ so far formed. Each primitive can be expressed by the following equation (3) as a product set of plural half-spaces.

$$P_i = \bigcap_{j=1}^{m} (G_{ij}(\vec{X}) \geq 0) \quad (3)$$
$(i = 1, \ldots, n)$ wherein $G_{ij}(\vec{X})$ denotes a half-space equation.

Figure 6A:
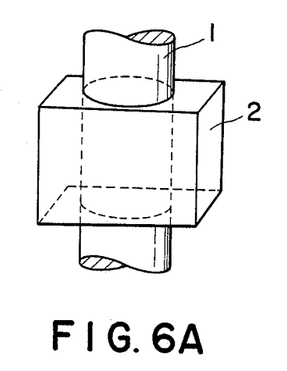
FIGS. 6A and 6B are explanatory views of the concept of primitives.
Figure 6B:
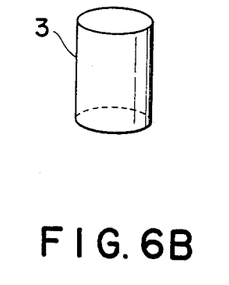

A primitive can generally be expressed by a product set operation of one or more than one half-space(s) (element(s)) characterized by the primitive and a rectangular parallelepiped (a domain) which is needed to make the primitive a closed space. FIGS. 6A and 6B show these relationships. For example, a primitive 3 in FIG. 6B can be obtained by operation. "(element 1) ∩ (domain 2)", on the element 1 and the domain 2 shown in FIG. 6A.

Description will now be given to the offset processing section 110.

An offset half-space can be expressed same as the half-space equation of each primitive as follows according to the above equation (3):

$$P_i^0 = \bigcap_{j=1}^{m} (G_{ij}^0(\vec{X}) \geq 0) \quad (3)$$
$(i = 1, \ldots, n)$ wherein $G_{ij}^\circ(\vec{X})$ denotes an offset half space equation. If the offset primitive is substituted in the above mentioned equation (2), 3D-solid model $S_n^\circ$ can mathematically be expressed as below:

$$S_n^\circ = ((\ldots((\phi.OP_1.P_1^\circ).OP_2.P_2^\circ)\ldots ).OP_n.P_n^\circ) = (S_{n-1}^\circ.OP_n.P_n^\circ) \quad (5)$$

Figure 7:
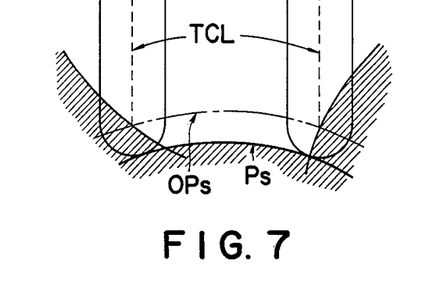
FIG. 7 is a view to show an example of over-cutting.
Figure 8:
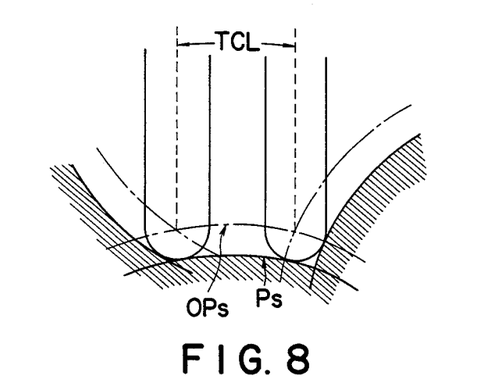
FIG. 8 is a view of offsetting a cutting surface and adjacent surfaces.
Figure 9:
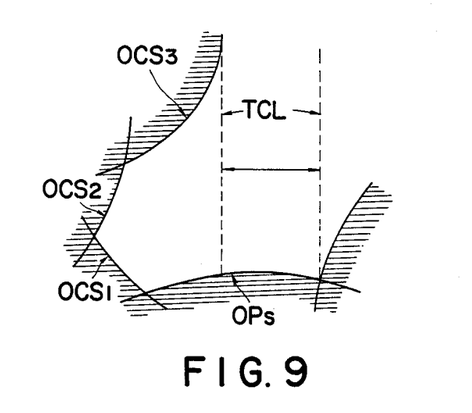
FIG. 9 is a view of offsetting an overhung.

The above shape $S_n^\circ$ is named herein as "an offset shape". For instance, if a half-space equation expresses $G_{ij}(\vec{X}) = ax + by + cz + d$ as plane, the offset half space equation expresses $G_{ij}^\circ(\vec{X}) = ax + by + cz + d - of$. If a certain offset value is given in the equation, and if all the surfaces including those irrelevant to the cutting are offset, it would lower the efficiency. Therefore, the surfaces which are subject to offset processing (herein referred to as "offset processing surface") should be limited to a certain extent. For instance, a half-space equation which indicates the surface ($P_s$) which should be subject to cutting is designated as an offset processing surface as shown FIG. 7. However, if the tool path is generated exclusively from the relation between the offset surface ($OP_s$) and a line tool (or the central axis of a tool; TCL), the boundary portion to the adjacent surface may be cut excessively. This can be prevented by offset-processing the adjacent surfaces in a manner similar to the above as shown in FIG. 8. If we consider an overhang in the tool approach direction as shown in FIG. 9, it is necessary to offset all the necessary surfaces taking into account the relation between surfaces to obtain an offset surface ($OCS_2$, $OCS_3$) and to obtain an area where the central axis (TCL) of the tool can move in addition to the offset surfaces $OP_s$ where cutting should be conducted and the offset surfaces $OCS_1$, of adjacent surface in order to prevent over-cutting. More specifically, the surface like the offset surface of the adjacent surface shown in FIG. 8 or the offset surfaces ($OCS_1$, $OCS_2$, $OCS_3$) shown in FIG. 9 can play same role of the check surfaces in the aforementioned APT system. This can avoid simply the collision between a tool (including a tool holder) and an environmental model including a workpiece. This invention method attempts to solve the problem of collision by automatically selecting all the surfaces (half-spaces) which play the role of check surfaces in the APT system, offset processing the surfaces, disregarding a particular shape of a tool but treating the tool as a line to thereby replace the original relation between the 3D-solid models and the tool with the relation between 3D-solid models and a line. For instance, if a half-space is designated as a cutting surface, as all the half spaces ultimately belong to the primitives, this invention method automatically selects the primitives which have offset processing surfaces by the following steps to increase the efficiency.

Figure 10:
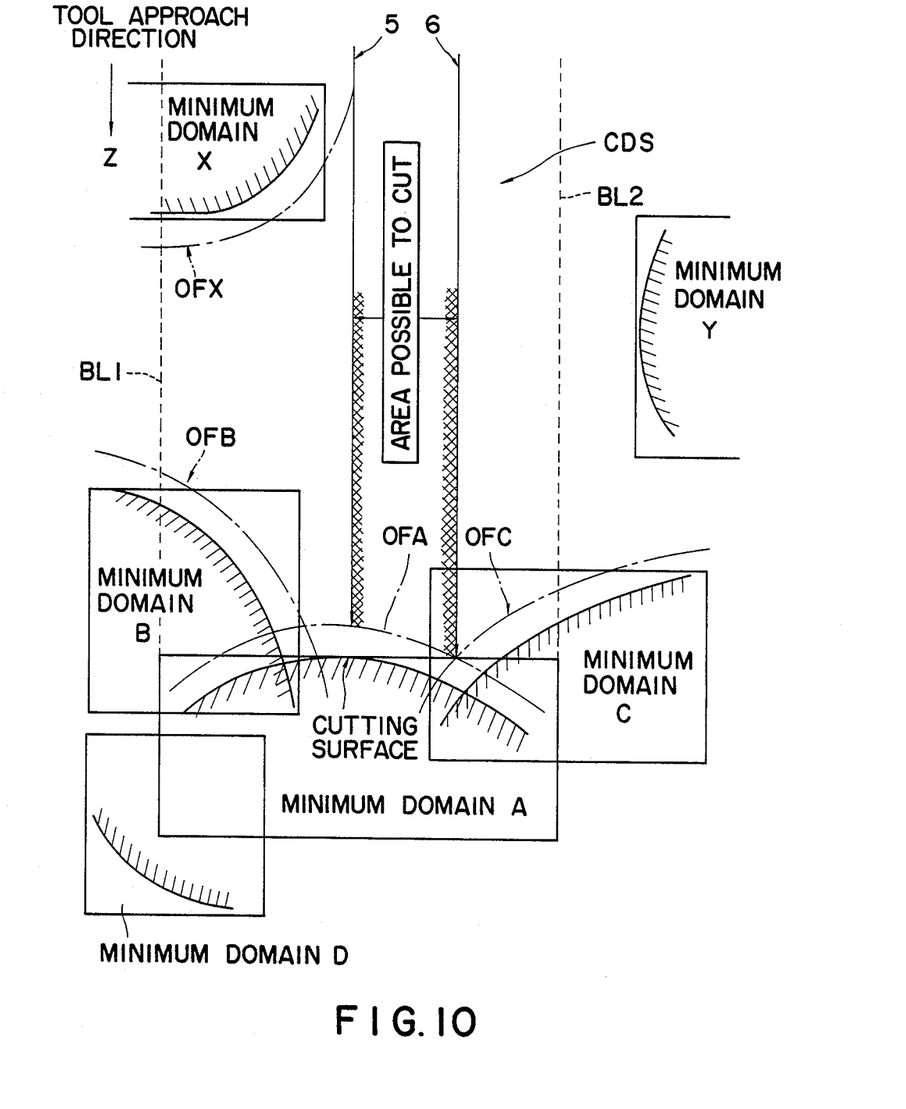
FIG. 10 is a view to explain steps of selection of primitives using minimum domains.

FIG. 10 shows the steps (i) through (iv) of the processing. In the figure, the letters OFX, OFB, OFA and OFC denote respectively the offset surfaces on the surfaces of the shape included in the minimum domains X, B, A and C, the numerals 5 and 6 respectively denote line tools, and the area CDS defined by the dashed lines BL1 and BL2 denote a cutting domain on the cutting surface.

Figure 11:
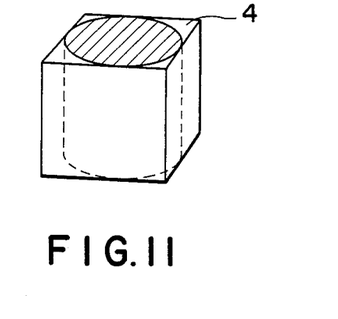
FIG. 11 is a view to explain the concept of the minimum domain.

(i) A minimum rectangular parallelepiped ("a minimum domain" having surfaces vertical to the axes x, y, z) including a primitive is set for all the primitives which form a shape. The minimum domain 4 in FIG. 11 shows an example.

(ii) The minimum domain including the half-space designated as the cutting surface is checked to determine whether or not it is interfered by other minimum domains, and if it is interfered, it is flagged as collision "1". In FIG. 10, the letter A denotes the minimum domain including the cutting surface, the letters B, C, D denote the minimum domains which are flagged as collision "1", and the letters X, Y denote the minimum domains which are not flagged as collision "1".

(iii) A cutting domain CDS is defined by a tool approach direction Z and the minimum domain surface including the cutting surface, and whether or not a collision exists between the domain CDS and other minimum domains is checked. If there is a collision, it is flagged as collision "2". FIG. 10 shows the minimum domains where the collision "2" is flagged as B, C and X, and the minimum domains where collision "2" is not flagged as D and Y.

(iv) Selected primitives are discriminated as follows:
(a) The minimum domains where the collision "1" and "2" are flagged, and
(b) The domains where the collision "1" is not flagged but collision "2" is flagged are selected and registered as the primitives for offset processing. In FIG. 10, the minimum domains B, C and X are selected. The domain where the collision "1" is flagged but "2" is not are the minimum domains which possibly defined the cutting areas if the tool approach direction changes.

Instead of designating the cutting surface, if the areas are designated by rectangular parallelepipeds comprising surfaces vertical to the respective axes, the primitives which are subject to offset processing can easily be selected by checking the collision with the minimum domain of each primitive in the manner similar to the above.

The method for checking the collision between the minimum domains (or between rectangular parallelepipeds comprising the surfaces vertical to the respective axes) will now be described. It is assumed herein that the minimum domains of two primitives are expressed by DP1 and DP2. Since each minimum domain comprises two planes vertical to the respective axes in DP1 and DP2, the coordinates which are smaller in the same axial direction are expressed as DL1(i) and DL2(i) while those which are larger are expressed as DU1(i) and DU2(i) (i=1, 2, 3 which respectively corresponds to the axes x, y and z). Then, the relation below holds.

$$\begin{cases} DP1 \ldots (DL1(i), DU1(i)) & (i = 1 \sim 3) \\ DP2 \ldots (DL2(i), DU2(i)) & (i = 1 \sim 3) \end{cases}$$

Figure 12:
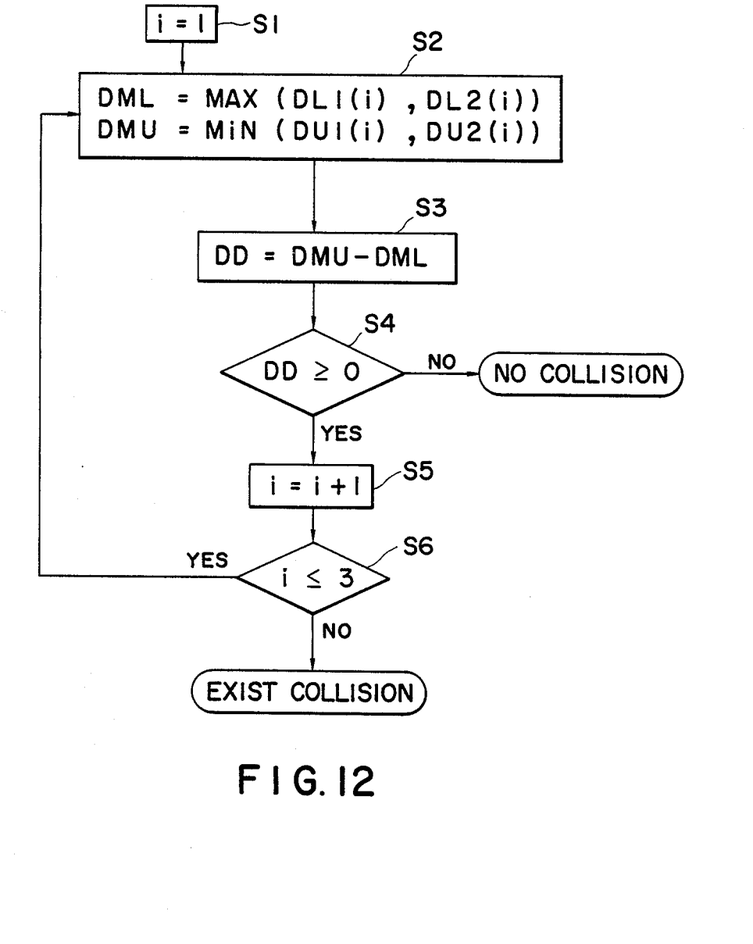
FIG. 12 is a flow chart to show an example of operation for collision checking between minimum domains.

Based upon the above, the existance of collision can be checked following the steps shown in a flow chart in FIG. 12.

More praticularly, the existance of collision is checked first for the X axis direction (i=1; S1). At the step S2, either one of the minimum domain 1 having a smaller X coordinate DL1 (1) and the minimum domain 2 having a smaller X coordinate DL2 (1), whichever is larger, is substituted in DML. Then either one of the other coordinates DU1 (1) and DU2 (1) of each minimum domain, whichever is smaller, is substituted in DMU. At the step S3, the difference obtained by subtracting DML from DMU is then substituted in DD. At the step S4, the decision section S4 judges there is not collision if the value DD is less than "0" as the two minimum domains do not exist collision with each other in the direction of x axis. Contrary, if the value is "0" or higher, the collision by the length DD exist in the X axis direction. Then, similar checking procedures are executed in the Y and Z axis directions (S5), too. Only when all the values of DD in the direction of axes X, Y and Z are "0" or higher, the two domains are judged to exist collision with each other.

Figure 13A:
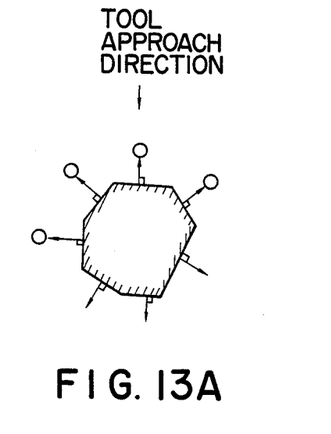
FIGS. 13A and 13B are explanatory views of determining the offset processing surface.
Figure 13B:
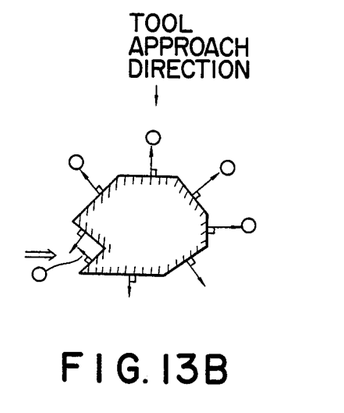

The offset processing surface may be defined by obtaining offset half spaces for all the half spaces which form a selected primitive, but may be limited by obtaining the offset half spaces for only the half spaces of which inner product of the vector of the tool approach direction with normal vector thereof becomes less than "0". For instance, in the case shown in FIG. 13A the four half-spaces marked with circles ○ are selected while in the case shown in FIG. 13B, the five half-spaces marked with circles ○ are selected as the offset processing surfaces. The half space indicated by an arrow mark in FIG. 13B is an overhang and is therefore impossible to be cut, but this will be discriminated in the next step by the tool path generating section 120. The offset value is automatically determined by the data on attributes of the designated surfaces such as roughness and the tool radius.

Figure 14A:
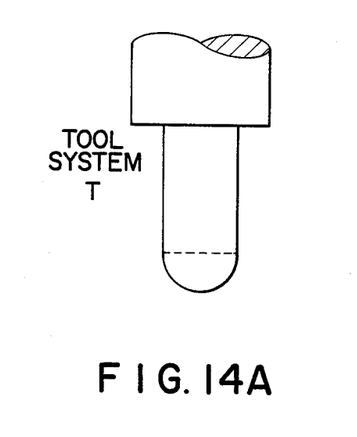
FIGS. 14A and 14B are conceptual views of a tool system.
Figure 14B:
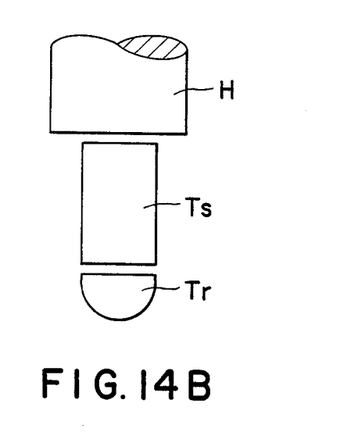
Figure 15A:
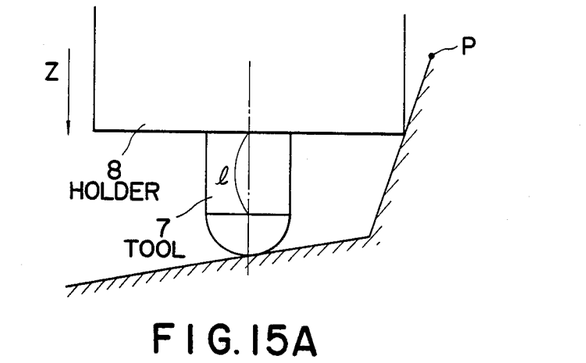
FIGS. 15A through 15C are views to show examples of offset surfaces taking into account the tool holders, respectively.
Figure 15B:
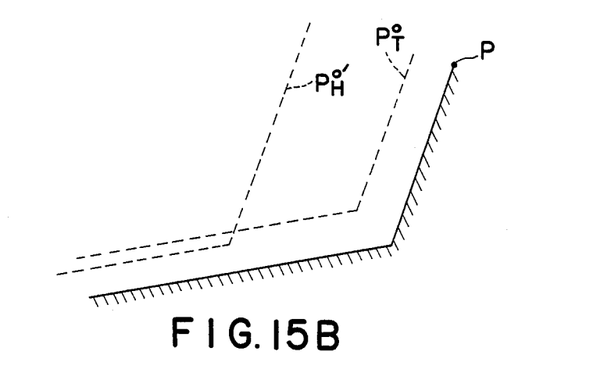
Figure 15C:
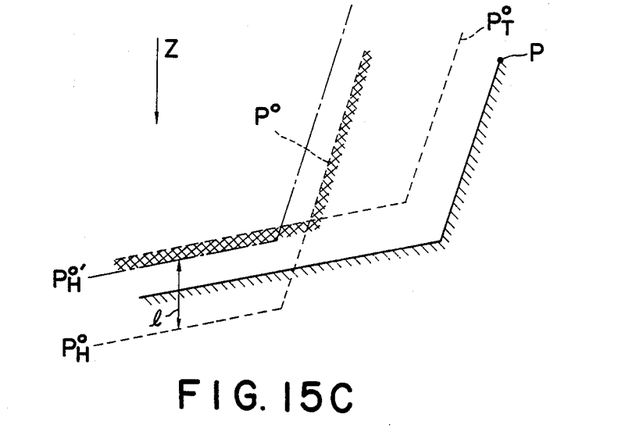

The relation between tools and the offset-processing will be described below. Since this invention method takes into account the tool holders in addition to the tools, the tool system T shown in FIG. 14A is divided into the tip portion of the tool Tr, the straight portion Ts and the holder H as shown in FIG. 14B, in which the portions Tr and Ts form a tool part. In the offset-processing, the offset surface P° for the whole tool system T can be simply obtained as a union set of the two offset surfaces $P_T°$, $P_H°$) of the tool part (Tr and Ts) and the holder part H. In other word, if the positional relation among the surface of a shape P, the tool part 7 and the holder part 8 is as shown in FIG. 15A, the offset surface $P_T°$ of the surface P for the tool part 7 and the offset surface $P_H°'$ of the surface P for the holder part H will be obtained respectively as shown in FIG. 15B. The offset surface $P_H°$ will be obtained by lowering the surface $P_H°'$ by the length l of the tool in the tool approach direction thereof as shown in FIG. 15C. Accordingly, the offset surface $P°$ of the surface P for the whole tool system T can be expressed as a union set of the offset surfaces $P_H°$ and $P_T°$ as shown in the following expression (Cross-hatching area in FIG. 15C).

$$P° = P_T° \cup P_H° \qquad (6)$$

Respective offset surfaces of the tool part and the holder part will now be described.

Figure 16A:
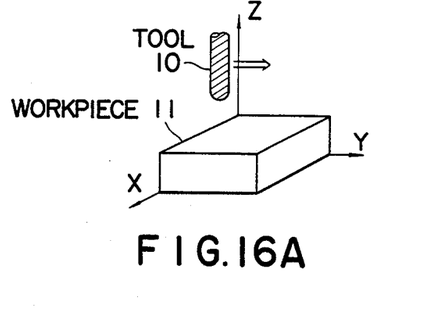
FIGS. 16A through 16D are explanatory view of the relation between offset models and a line tool, respectively.
Figure 16B:
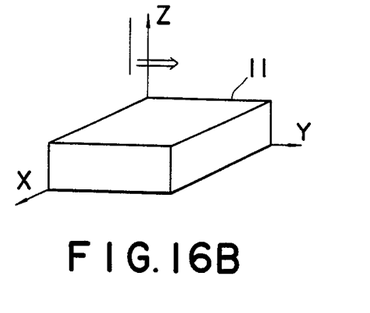
Figure 16C:
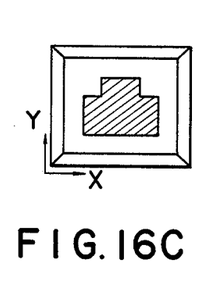
Figure 16D:
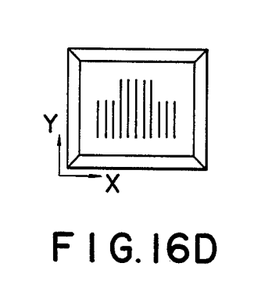

As mentioned above, the tool part is divided into the tip portion $T_r$ and the straight portion $T_s$. The shape can be offset in accordance to shape of the tip portion $T_r$, and the straight portion $T_s$ is simply substituted with a line tool $T_c$. FIGS. 16A through 16D show steps of tool path generation: the path of a tool 10 for the workpiece 11 is obtained by offset for the parts as shown in FIG. 16B, then obtaining the cutting area as shown by cross-hatching area in FIG. 16C and generating the path as shown in FIG. 16D. The tip portion Tr is herein exemplified by (1) a ball-endmill and (2) a flat-endmill.

1. In the case of a ball-endmill

Figure 17:
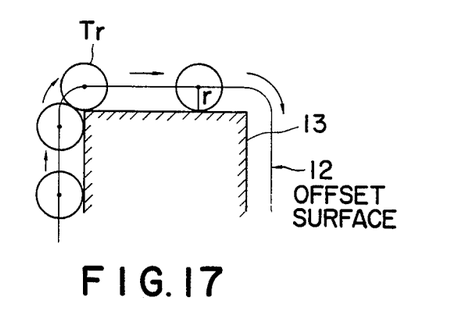
FIG. 17 is a view to show an example of offset in the case where the tool is a ball-endmill.

The tip portion $T_r$ is regarded as a sphere having the tool radius r as the radius thereof as shown in FIG. 17. The offset surface 12 can be obtained by tracing the path of the ball center which moves on the shape surface 13. In other words, it is the surface obtained by translating each surface of the shape surface 13 by the radius r in the normal direction of the surface.

2. In the case of a flat-endmill

Figure 18:
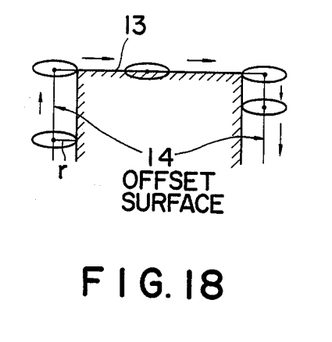
FIG. 18 is a view to show an example of offset in the case where the tool is a flat-endmill.

As shown in FIG. 18, the tip portion $T_r$ is an end face of a tool which can be regarded as a circle having the tool radius r as the radius. The offset surface 14 is obtained by tracing the path of the center of the circle when the circle moves on the shape surface 13 while it maintains the position vertical to the tool axis.

For the holder part 8, the offset surface is formed in a manner similar to the case of the flat-endmill assuming the tool length as l, by translating the offset surface by the length l in the direction of the tool axis (Refer to FIG. 15C).

The tool path generating section 120 will now be explained.

Since the tool is not treated a solid model but a line by offset processing an environmental model including the workpiece, the tool paths are generated herein as a graphic problem viewed from the direction of a tool axis by such functions as a surface selecting function and a hidden line (hidden surface) removal processing function, etc. Various different tool paths can be generated by varying types of graphic algorithms. There may be various graphic algorithms which are exemplified herein with (1) Contour line method, (2) Scan-line method and (3) Ray-tracing method.

Figure 19:
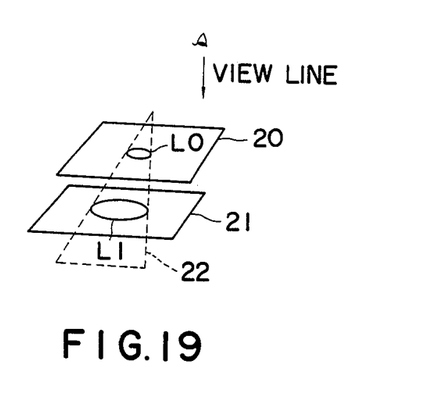
FIGS. 19 through 21 are the contour method, the scan-line method and ray tracing method of graphic algorithms, respectively.

1. As view in FIG. 19, this method sets planes 20 and 21 vertically to the view line at an interval, and obtains intersection lines L0 and L1 between each plane and the shape 22.

Figure 20:
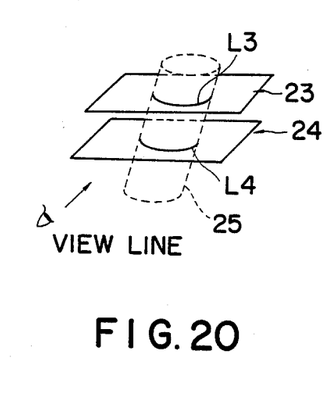

2. As shown in FIG. 20, this method obtains intersection lines L3, L4 and contour points between each plane (scan-line planes) 23, 24 parallel to the view line and the shape 25 to calculate information on depth.

Figure 21:
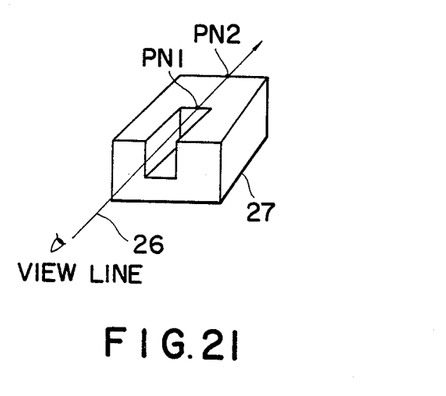

3. As shown in FIG. 21, the ray-tracing method generates a probe (a half line) 26 in the view direction, obtains intersection points PN1 and PN2 with the shape 27, and obtains the closest point PN1 by set-operation.

Figure 22A:
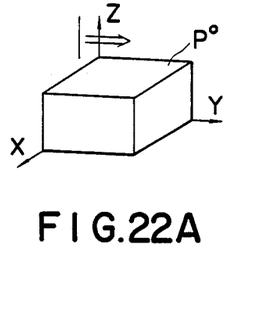
FIGS. 22A through 22F are views to show steps of generation of tool path by the scan-line method, respectively.
Figure 22B:
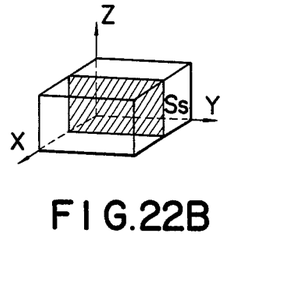
Figure 22C:
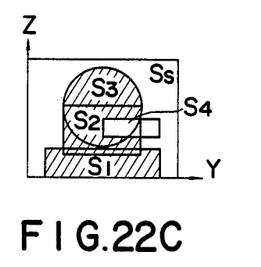
Figure 22D:
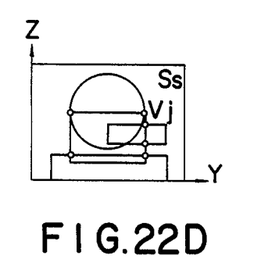
Figure 22E:
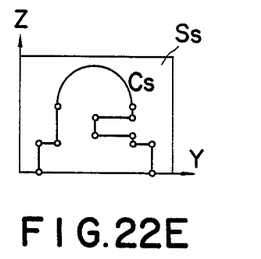
Figure 22F:
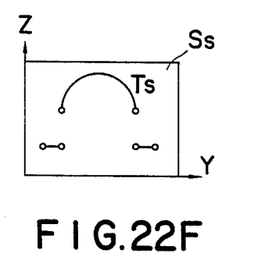

By using the above three algorithms, the cutting area can be visually and graphically expressed as graphics viewed from the tool axis. The methods for generating tool paths in correspondence to above-mentioned methods (1) through (3) will be explained in further detail herein. As both the contour line method (1) and the scan-line method (2) set planes, the methods for generating the tool paths based on these methods will be referred to as the contour method and the scan-line method respectively. FIGS. 22A through 22F show the procedures of the scan-line method, and FIGS. 23A through 23F those of the contour method in the order of steps. More particlurly, according to the scan-line method, a part P is offset by an offset value corresponding to a tool radius to form a part $P°$, and a scan-line plane $S_s$ shown in FIG. 22B is set as a pick feed plane. The intersection $C_i$ between the each primitive $S_i$ forming the part $P°$ and scan-line plane $S_s$ are obtained (FIG. 22C) and the intersection points $V_j$ between the primitives are obtained (FIG. 22D). Then, a contour line $C_s$ between the part $P°$ and scan-line plane $S_s$ are obtained from the intersections $C_i$ and $V_j$ are removed the hidden lines on the line $C_s$ in the direction of Z. As a result the tool path $T_s$ without tool collision will be obtained as shown in FIG. 22F.

Figure 23A:
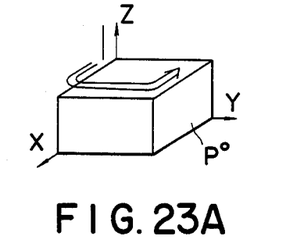
FIGS. 23A through 23F are views to show steps of generation of tool path by the contour method.
Figure 23B:
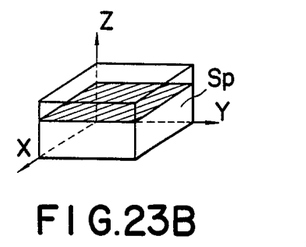
Figure 23C:
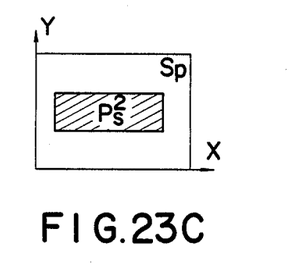
Figure 23D:
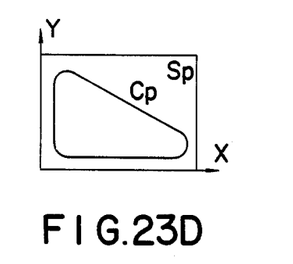
Figure 23E:
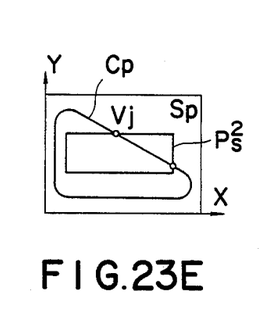
Figure 23F:
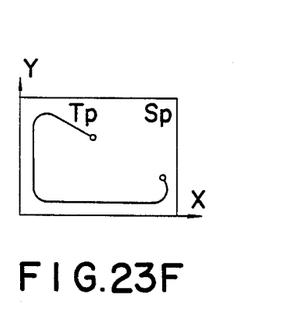

As shown in FIG. 23A, the contour method, on the other hand, offset-processes the part P to obtain the offset part $P°$ and defines the pick feed plane $S_p$ vertical to the tool axis as shown in FIG. 23B. An intersection line $C_p$ between the offset part $P°$ and the pick feed plane $S_p$ are obtained in a manner similar to the above (see FIG. 23D). The projection $P_s^2$ of the product set $P_s$ ($=P° \cap S_p^+$) of the half space $S_p^+$ in the direction of $Z^+$ (Z: tool approach direction) with the pick feed plane $S_p$ as a boundary and the part $P°$ on the pick feed plane $S_p$ is obtained (Refer to FIG. 23C). As the boundary of the projections $P_s^2$ is a quadratic curve, the intersecting point $V_j$ with the intersection line $C_p$ can be analytically obtained by solving a quartic equation. A tool path $T_p$ will be obtained as shown in FIG. 23F by removing the areas included in the projection $P_s^2$ out of the intersection lines $C_p$.

Figure 24:
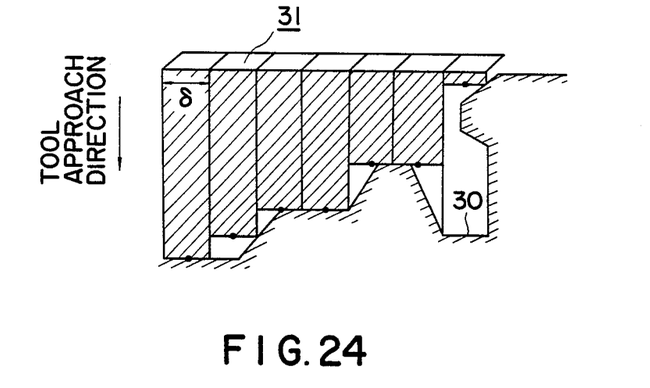
FIG. 24 is an explanatory views of obtaining depth information by using the ray tracing method.

The method with the ray-tracing method (3) above obtains infomation on depth at several points (e.g. a center and four other corner points) of a block 31 (a square vertically to the tool axis), having a certain width on the offset surface 30 as shown in FIG. 24. Out of the depth information, the minimum value is obtained repeatedly as the information on the depth of the particular block until the information are calculated for all the blocks. By approximating planes with those information, a tool path, though more or less rough, can be obtained.

Judging from the above, the scan-line contour methods are judged more suitable for finish cutting while the method based on the ray-tracing (a drilling) is suitable for rough cutting.

In order to achieve a higher efficiency in cutting the offset processing by the offset value taken into account the finish margin, it would be desirable from the point of operators' view to machine on a shape which is approximated to planes to a certain extent. However, if it is too much approximated, the finish margins become uneven in several portions. It is critical how to compromise those two requirements.

Figure 25:
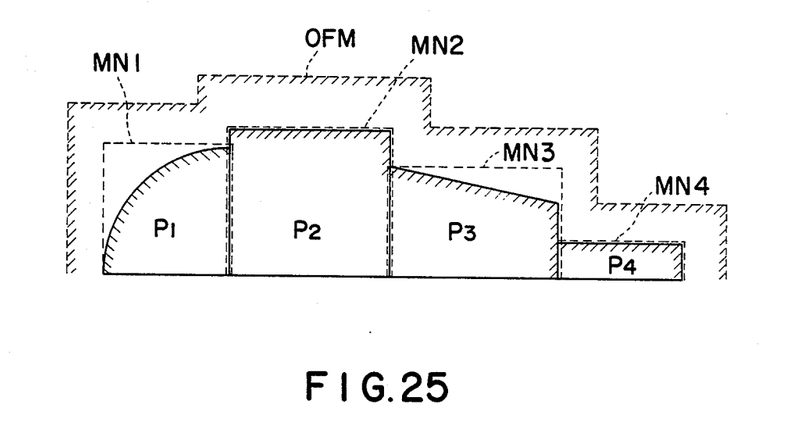
FIG. 25 is an explanatoy view of increasing working efficiency by offsetting the minimum domain.
Figure 26A:
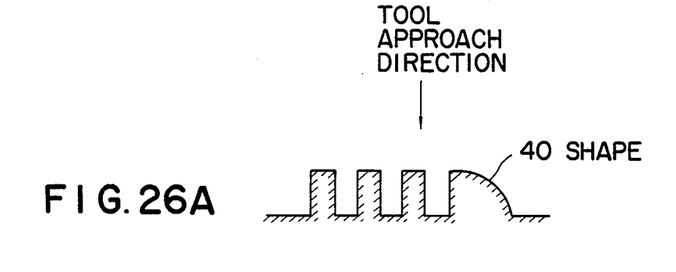
FIGS. 26A through 26C are explanatory views of increasing working efficiency by offset-processing in negative and the maximum offset value.
Figure 26B:
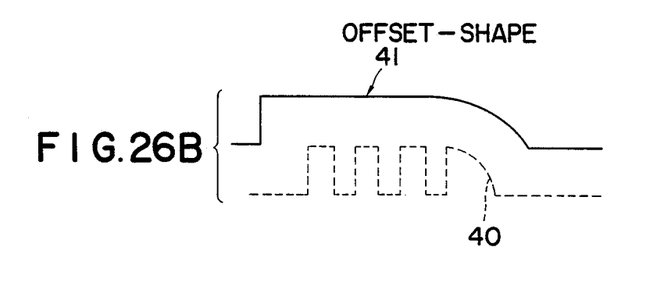
Figure 26C:
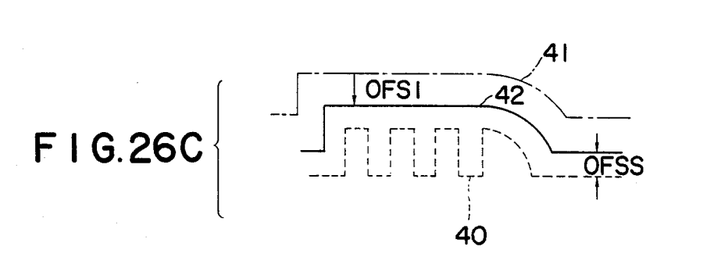

Two methods seem possible. One of them is the method which approximates primitives forming a shape to rectangular parallelepipeds having the planes vertical to each axis by setting the aforementioned minimum domains, and offsets them with the offset value including a finish margin. FIG. 25 shows an example; minimum domains NM1 through NM4 are set for the primitives P₁ through P₄ and then offset surface OFM is obtained with the offset value including the finish margin. As the offset surface comprises only planes vertical to or parallel to the tool approach direction, the efficiency of cutting is enhanced. The another method is the one shown in FIG. 26A wherein a shape 40 which is inputted to the offset processing section 110 is roughly processed by a large offset value to simplify the shape by deleting holes and grooves and so on which existed in the shape 40 as shown in FIG. 26B. Then it is negatively offset as shown in FIG. 26C by the offset value OFS1 obtained by subtracting the offset value OFSS including the finish margin from that large offset value. Unlike other methods this method is capable of leaving finish margins uniform to a certain extent.

As described in the foregoing statement, this invention method can generate tool paths which can visually express areas which can be cut by automatically checking (for prevention of over-cutting) the collision between an environmental model including workpieces and tools (including holders) by offset-processing, and using a graphic algorithm. This method is capable of enhancing the cutting efficiency by conducting offset processing (of two types) by the offset value taken into account the finish margin and generating tool paths. The special features of this invention will be summarized as follows:

(a) A problem among 3D-solid models on tool collision checking is easily solved by replacing the problem with the problem between 3D-solid models and a line.

(b) The cutting area can be visually expressed as a graphics on a display by introducing a graphic function.

(c) Various types of tool paths can be generated by scan-line method, contour method, etc. in accordance to various graphic algorithms.

(d) This invention method allows a tool to take an arbitrary direction and is capable of automatically checking tool collision in generation of tool paths.

(e) Cutting efficiency can be enhanced in generating tool paths as this invention method conducts offset processing by the offset value taken into account the finish margin and in accordance to shapes of tools (including tool holders).

(f) As this invention method allows visible expression of the area where a tool can move, it becomes possible to check presence of uncut areas by comparing it with required shapes.

It should be understood that many modifications and adaptations of the invention will become apparent to those skilled in the art and it is intended to encompass such obvious modifications and changes in the scope of the claims appended hereto.

What is claimed is:

1. A method for generating a tool path in a CAD/CAM system which is characterized by the steps of replacing the relation between an environmental model including a workpiece and a tool by a relation between a 3D-solid model representing the workpiece and a line representing the tool, and checking said line for collision by offsetting (offset processing) the 3D-solid model in a direction normal to a surface of the 3D-solid model in correspondence to the radius of said tool by an offset value which includes a finish margin; and wherein said offset processing comprises the steps of roughly processing an inputted shape with a large offset value, simplifying the shape by deleting at least holes and grooves which exist in the shape and negatively offsetting the simplified shape by subtracting the offset value from the large offset value.

2. The method for generating a tool path as claimed in claim 1 wherein said offset-processing further comprises the steps of approximating primitives which comprise rectangular parallelapipeds formed of planes vertical to each axis by setting a minimum domain and offsetting the rectangular parallelapipeds by the offset value.

3. The method for generating a tool path as claimed in claim 1 wherein said 3D-solid models are expressed with a CSG system.

4. The method for generating a tool path as claimed in claim 3 wherein said 3D-solid models are held by a set operation of primitives $P_i$ as follows.

$$S_n = ((\ldots \phi \cdot OP_i \cdot P_1) \cdot OP_2 \cdot P_2) \ldots) \cdot OP_n \cdot P_n)$$
$$= (S_{n-1} \cdot OP_n \cdot P_n)$$

wherein $OP_i$ is a set operation and parentheses are the order of the set operation.

wherein $OP_i$ is a set operation and parentheses are the order of the set operation.

5. The method for generating a tool path as claimed in claim 4 wherein said primitives $P_i$ are expressed by a following equation as a product set of plural half-space $G_{ij}(\vec{X})$:

$$P_i = \bigcap_{j=1}^{m} (G_{ij}(X) \geq 0)$$
$$(i = 1, \ldots, n)$$

6. The method for generating a tool path as claimed in claim 1 wherein said offset-processing is performed by automatically selecting all surfaces which play a role of check surfaces in an APT system.

7. The method for generating a tool path as claimed in claim 1 further comprising the steps of automatically determining the offset value in the offset processing from data on attributes of designated surfaces and a tool radius.

* * * * *